United States Patent
Wu et al.

(10) Patent No.: US 9,777,100 B2
(45) Date of Patent: *Oct. 3, 2017

(54) POLYMER LATEX BINDERS USEFUL IN ZERO OR LOW VOC COATING COMPOSITIONS

(71) Applicant: Arkema Inc., King of Prussia, PA (US)

(72) Inventors: Wenjun Wu, Cary, NC (US); Jihui Guo, Landsdale, PA (US); Jeffrey A. Schneider, Holly Springs, NC (US)

(73) Assignee: Arkema Inc., King of Prussia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/367,279

(22) Filed: Dec. 2, 2016

(65) Prior Publication Data

US 2017/0081454 A1  Mar. 23, 2017

Related U.S. Application Data

(63) Continuation of application No. 14/376,683, filed as application No. PCT/US2013/024700 on Feb. 5, 2013, now Pat. No. 9,527,942.

(60) Provisional application No. 61/597,438, filed on Feb. 10, 2012.

(51) Int. Cl.
| | |
|---|---|
| C08F 220/14 | (2006.01) |
| C08F 265/06 | (2006.01) |
| C08F 283/06 | (2006.01) |
| C09D 151/08 | (2006.01) |
| C08F 2/26 | (2006.01) |
| C09D 113/02 | (2006.01) |
| C08F 290/06 | (2006.01) |
| C09D 151/00 | (2006.01) |

(52) U.S. Cl.
CPC ............ *C08F 265/06* (2013.01); *C08F 2/26* (2013.01); *C08F 220/14* (2013.01); *C08F 283/065* (2013.01); *C08F 290/062* (2013.01); *C09D 113/02* (2013.01); *C09D 151/003* (2013.01); *C09D 151/08* (2013.01)

(58) Field of Classification Search
CPC ... C08F 220/14; C08F 283/065; C09D 113/02
See application file for complete search history.

(56) References Cited

U.S. PATENT DOCUMENTS

| | | | |
|---|---|---|---|
| 4,150,005 A | 4/1979 | Gehman et al. | 524/533 |
| 5,530,056 A | 6/1996 | Farwaha et al. | |
| 6,410,655 B2 | 6/2002 | Okubo et al. | |
| 2002/0132055 A1 | 9/2002 | Drujon et al. | |
| 2004/0221395 A1 | 11/2004 | Biver et al. | 8/94.15 |
| 2005/0107527 A1 | 5/2005 | Holub et al. | 524/817 |
| 2006/0241230 A1 | 10/2006 | Porzio et al. | |
| 2007/0105982 A1 | 5/2007 | Roschmann et al. | |
| 2007/0299180 A1 | 12/2007 | Joecken | |
| 2009/0098482 A1 | 4/2009 | Ray et al. | 430/281.1 |
| 2009/0326142 A1 | 12/2009 | Agnely et al. | |
| 2010/0144937 A1 | 6/2010 | Fu et al. | |
| 2010/0216934 A1 | 8/2010 | Sahlberg et al. | |
| 2011/0015334 A1 | 1/2011 | Numrich et al. | |
| 2011/0152439 A1 | 6/2011 | Wu et al. | |
| 2012/0004359 A1 | 1/2012 | Cavallin et al. | |

FOREIGN PATENT DOCUMENTS

| | | |
|---|---|---|
| CN | 102321326 A | 1/2012 |
| EP | 0 609 756 A2 | 8/1994 |
| EP | 1 274 738 B1 | 5/2005 |
| EP | 1 832 635 A1 | 9/2007 |
| EP | 1 106 660 B1 | 4/2010 |
| WO | WO 2005/030495 A2 | 4/2005 |
| WO | WO 2004/054384 A1 | 6/2005 |

OTHER PUBLICATIONS

W.A. Lee Royal Aircraft Establishment; Farnborough, Hants England: and R.A. Rutherford Rubber and Plastics Research Association of Great Britain, Shawbury, Shrewsbury, England "The Glass Transition Temperatures of Polymer" 1975 pp. 139-191.
Sipomer PAM 100 brochure Jul. 2009.

*Primary Examiner* — Mark Kaucher
(74) *Attorney, Agent, or Firm* — Lynn B. Morreale

(57) ABSTRACT

Polymer latex binders useful for preparing coating compositions containing low levels of, or which are substantially free of, volatile organic compounds (VOCs) such as volatile freeze-thaw additives are prepared by multistage emulsion polymerization, wherein one stage provides a copolymer having a relatively high glass transition temperature and containing an oxyalkylene-containing (meth)acrylate comonomer.

19 Claims, No Drawings

POLYMER LATEX BINDERS USEFUL IN ZERO OR LOW VOC COATING COMPOSITIONS

CROSS REFERENCE TO RELATED APPLICATIONS

This application is a continuation application of U.S. application Ser. No. 14/376,683, filed Aug. 5, 2014, which is a national stage application under 35 U.S.C. §371 of PCT/US2013/24700, filed Feb. 5, 2013, which claims benefit to U.S. patent application 61/597,438 filed on Feb. 10, 2012

FIELD OF THE INVENTION

The present invention relates to polymer latex binders useful for preparing coating compositions containing low levels of, or which are substantially free of, volatile organic compounds (VOCs) such as volatile freeze-thaw additives, as well as to methods of preparing such polymer latex binders and coating compositions.

BACKGROUND OF THE INVENTION

Latex coating compositions are utilized for a variety of applications, including, for example, as paints for various types of surfaces. However, such compositions are recognized as being potentially unstable when exposed to freeze-thaw cycles. That is, repeated freezing and warming of latex coating compositions can frequently lead to destabilization of the dispersed polymer in the latex (causing gel formation, for example). This, of course, is a significant problem since these coating compositions are expected to be exposed to a wide range of temperatures during shipment and storage. For this reason, various freeze-thaw additives have been formulated into latex coating compositions in order to improve their resistance to such temperature cycles. Traditionally, these additives have included relatively low molecular weight compounds such as alcohols, glycols and the like.

In recent years, however, such low molecular weight freeze-thaw additives have come under scrutiny since many are classified as volatile organic compounds (VOCs). Environmental regulations in many locations limit the level of VOCs that can be present in coating compositions. For this reason, there has been an effort to develop various new formulations that qualify as zero or low VOC yet still meet the freeze-thaw stability requirements expected in the industry.

SUMMARY OF THE INVENTION

The present invention provides a multiphase emulsion polymer comprising at least one hard phase polymer having a glass transition temperature of from 0 to 100° C. and at least one soft phase polymer having a glass transition temperature of less than 0° C. and at least 20° C. lower than the glass transition temperature of the hard phase polymer, wherein the hard phase polymer is a copolymer of at least one ethylenically unsaturated monomer and at least one oxyalkylene-containing (meth)acrylate corresponding to formula (I) or (II) or a mixture thereof:

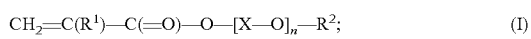

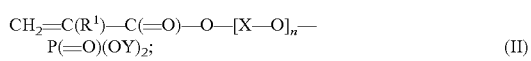

wherein $R^1$ is H or $CH_3$, $R^2$ is H or a $C_1$-$C_8$ alkyl group, each X is independently —$(CH_2)_2$—, —$CH_2CH(CH_3)$— or —$CH(CH_3)CH_2$—, each Y is independently H, ammonium or an alkali metal atom, and n is an integer of from 1 to 30. Such multistage emulsion polymers are useful in the formulation of latex coating compositions which have a low or zero VOC content and yet have good freeze-thaw stability. Latex coating compositions including the multistage emulsion polymers of the present invention are also capable of exhibiting low temperature film-formability and block resistance.

In another aspect of the invention, a polymer latex binder useful in a zero or low VOC latex coating composition is provided which comprises the afore-mentioned multiphase emulsion polymer in the form of latex particles, water, and at least one emulsifier.

A zero or low VOC latex coating composition is provided in another aspect of the invention, comprising the aforementioned polymer latex binder and at least one pigment.

The invention also provides a method of making a polymer latex binder, comprising:
(a) copolymerizing an aqueous emulsion of at least one ethylenically unsaturated monomer and at least one oxyalkylene-containing (meth)acrylate corresponding to formula (I) or (II) or a mixture thereof:

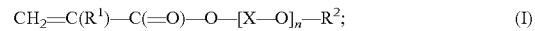

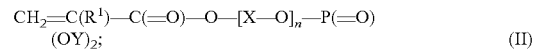

wherein $R^1$ is H or $CH_3$, $R^2$ is H or a $C_1$-$C_8$ alkyl group, each X is independently —$(CH_2)_2$—, —$CH_2CH(CH_3)$— or —$CH(CH_3)CH_2$—, each Y is independently H, ammonium or an alkali metal atom, and n is an integer of from 1 to 30, to form a hard phase polymer having a glass transition temperature of from 0 to 100° C.;
(b) polymerizing one or more additional monomers in the presence of the hard phase polymer to form a soft phase polymer;
wherein the hard phase polymer has a glass transition temperature of from 0 to 100° C. and the soft phase polymer has a glass transition temperature of less than 0° C. and at least 20° C. lower than the glass transition temperature of the hard phase polymer.

The present invention further provides a multiphase emulsion polymer comprising at least two polymer domains prepared via a multistage emulsion polymerization in which subsequent stage polymerizations occur in the presence of the first and succeeding stage and in which one of the polymer domains comprises a hard phase polymer having a glass transition temperature of from 0 to 100° C. and another of the polymer domains comprises a soft phase polymer having a glass transition temperature of less than 0° C. and at least 20° C. lower than the glass transition temperature of the hard phase polymer, wherein the hard phase polymer is a copolymer of at least one ethylenically unsaturated monomer and at least one oxyalkylene-containing (meth)acrylate corresponding to formula (I) or (II) or a mixture thereof:

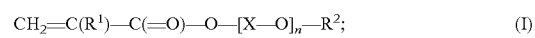

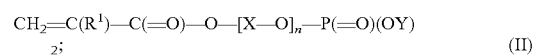

wherein $R^1$ is H or $CH_3$, $R^2$ is H or a $C_1$-$C_8$ alkyl group, each X is independently —(CH$_2$)$_2$—, —CH$_2$CH(CH$_3$)— or —CH(CH$_3$)CH$_2$—, each Y is independently H, ammonium or an alkali metal atom, and n is an integer of from 1 to 30.

DETAILED DESCRIPTION OF THE INVENTION

The polymer particles of the latex of this invention may be characterized as multi-stage polymers having a soft (low Tg) polymer phase (domain) and a hard (high Tg) polymer phase (domain), which are prepared via a multi-stage emulsion polymerization in which subsequent stage polymerizations occur in the presence of the first and succeeding stage polymer phases. Generally, the polymerizations are two-stage polymerizations in which either stage can produce the soft or hard polymer phase. In one desirable embodiment of the invention, the hard polymer phase is formed first, followed by the soft polymer phase. As measured by standard differential scanning calorimetric methods, the soft polymer phase may, for example, have a Tg in the range of 0 to −70° C. and the hard polymer phase may, for example, have a Tg in the range of 0 to 100° C. or 10 to 90° C. (inclusive). In one embodiment of the invention, there will be a difference in the Tg values between the two phases of 20 to 100° C.

In one embodiment of the invention, the soft polymer phase is an inner (core) phase within the polymer particles and the hard polymer phase is an outer (shell) phase.

The size of the polymer particles can vary. However, in various desirable embodiments of the invention, the particles have an average diameter of less than 350 nm, or less than 300 nm, or less than 250 nm, or less than 200 nm, or less than 100 nm (inclusive). Particle size and particle size distribution may be analyzed using Nanotrac UPA 150 (from Microtrac Inc.) to provide volume-averaged particle sizes based on dynamic light scattering techniques.

The soft polymer phase may, in various embodiments of the invention, represent from 90% to 40% by weight, or from 80% to 50% by weight, of the total polymer present in the polymer particles (inclusive). The hard polymer phase may represent from 10% to 60% by weight, from 20% to 50% by weight, of the total polymer present in the polymer particles (inclusive). In one embodiment, the total of the weight % of the soft polymer phase and the weight % of the hard polymer phase is 100%.

The soft polymer phase may be prepared either as a homopolymer or as a copolymer from ethylenically unsaturated monomers (e.g., vinyl or (meth)acrylic containing monomers or other monomers containing polymerizable carbon-carbon double bonds). The hard polymer phase, as will be explained in more detail subsequently, is a copolymer of at least one oxyalkylene-containing monomer and at least one additional monomer (other than an oxyalkylene-containing monomer) which is an ethylenically unsaturated monomer such as a vinyl- or (meth)acrylic-containing monomer. The particular choice of monomers for either phase will depend, among other considerations, on the desired Tg value for the phase. The glass transition temperatures of the polymer phases can be calculated using the Fox equation:

$$1/Tg(\text{polymer})=W(a)/Tg(a)+W(b)/Tg(b)+\ldots,$$

where W(a) and W(b) are the weight fractions of comonomers (a) and (b) and Tg(a) and Tg(b) are the glass transition temperatures for homopolymers (a) and (b), respectively. Glass transition temperatures for various homopolymers are available in many literature sources, including J. Brandup and E. H. Immergut, Polymer Handbook, 2nd ed., John Wiley & Sons, New York, pp 139-192 (1975).

Suitable examples of ethylenically unsaturated monomers include vinyl- and (meth)acrylic-containing monomers such as the alkyl esters (in particular, the C1-C18 alkyl esters, where the alkyl group is linear or branched) of acrylic and methacrylic acid such as methyl(meth)acrylate, ethyl(meth)acrylate, n-propyl(meth)acrylate, isopropyl(meth)acrylate, n-butyl(meth)acrylate, isobutyl(meth)acrylate, pentyl(meth)acrylate, 2-ethylhexyl(meth)acrylate, decyl (meth)acrylate, dodecyl (meth)acrylate, and stearyl (meth)acrylate; halo- and hydroxyl-substituted alkyl esters of (meth)acrylic acid such as α-chloroethyl(meth)acrylate, 2-hydroxyethyl(meth)acrylate, 2- and 3-hydroxypropyl(meth)acrylate, and 4-hydroxybutyl (meth)acrylate; vinyl esters of linear and branched carboxylic acids having 1 to 25 carbon atoms, preferably 2 to 20 carbon atoms, such as vinyl acetate, vinyl propionate, vinyl butyrate, vinyl valerate, vinyl 2-ethylhexylacrylate, vinyl isononanoate, vinyl laurate, vinyl stearate, vinyl versatate; styrene and styrene derivatives, such as alpha-methylstyrene, 2-chlorostyrene, 4-chlorostyrene, 2,5-dichlorostyrene and 4-methoxystyrene; as well as polymerizable unsaturated carboxylic acids such as unsaturated C3-C6 monocarboxylic acids, e.g., methacrylic acid, acrylic acid, and crotonic acid, monoesters of unsaturated C4-C6 dicarboxylic acids such as mono-methylmaleate and mono-ethylmaleate, and unsaturated C4-C6 dicarboxylic acids, such as fumaric acid, maleic acid, and itaconic acid. Other examples of suitable monomers include (meth)acrylonitrile; cycloalkyl (meth)acrylates such as cyclohexyl(meth)acrylate; aryl and alkaryl esters of (meth)acrylic acid such as phenyl (meth)acrylate; acetoacetate moiety containing monomers such as 2-acetoacetoxyethyl (meth)acrylate, 3-acetoacetoxypropyl (meth)acrylate, 4-acetoacetoxybutyl (meth)acrylate, 2-cyanoacetoxyethyl (meth)acrylate, 3-cyanoacetoxypropyl (meth)acrylate, 4-cyanoacetoxybutyl (meth)acrylate, N-(2-acetoacetoxyethyl) (meth)acrylamide, allyl acetoacetate, 2,3-di(acetoacetoxy)propyl (meth)acrylate, and vinyl acetoacetate; amide group-containing monomers such as (meth)acrylamide, diacetone acrylamide and maleinamide; epoxy group-containing monomers such as glycidyl (meth)acrylate and allylglycidyl ether; vinyl chloride; olefins such as ethylene; dienes such as butadiene, and the like.

In order to enhance the wet adhesion of the ultimate latex coating composition, either one or the other, or both the soft phase polymer or the hard phase polymer, may comprise a wet adhesion monomer, or a combination of wet adhesion monomers. These monomers are well known in the art and include ethylenically unsaturated amino-, urea- and ureido-functionalized monomers such as aminoethyl acrylate and methacrylate, dimethylaminopropyl acrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N-(3-dimethylamino-2,2-dimethylpropyl) acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacryloyloxyethyl) ethylene urea, N-(2-methacryloxy-acetamidoethyl)-N,N'-ethyleneurea, allylalkyl ethylene urea, N-methacrylamidomethyl urea, N-methacryoyl urea, 2-(1-imidazolyl) ethyl methacrylate, N-(methacrylamido) ethyl ethylene urea (Sipomer WAM II, Rhodia) and allyl ureido wet adhesion monomer (Sipomer WAM, Rhodia).

The wet adhesion monomers may, for example, be present in the soft or hard phase polymer in an amount from 0.2% to 2.0% by weight of the total polymer.

To reduce mixing between the two polymer phases and improve the block resistance of the coating formulations, either or both of the phases may comprise a low level of a multifunctional crosslinking monomer having two or more polymerizable carbon-carbon double bonds per molecule, such as vinyl or allyl acrylate or methacrylate, divinyl benzene, diallyl maleate, multifunctional acrylates and methacrylates, and methylene-bis-acrylamide. The multifunctional monomer may be present in an amount from 0.01% to 5% by weight of the total polymer.

When either or both of the polymers constituting the phases comprise one or more carbonyl-containing monomers (such as a monomer bearing an acetoacetate functionality), crosslinking reactions involving these monomers may be achieved by adding carbonyl-reactive crosslinking agents or compounds to the polymer. Examples of carbonyl-reactive compounds include polyfunctional amines, hydrazine, alkyl dihydrazines, alkylene dioxime ethers, and dihydrazides of dicarboxylic acids. Crosslinking of the polymers may take place during drying of a film of the latex coating composition.

Chain transfer agents including mercaptans, polymercaptans, alcohols, and halogen compounds may, if so desired, be used in the polymerization mixture in order to moderate the molecular weight of the polymer. Chain transfer agents may be used in either stage of the two stage polymerization.

The hard phase polymer is a copolymer of an ethylenically unsaturated monomer (such as any of the vinyl- and acrylic-containing monomers previously mentioned, including mixtures thereof) and a second ethylenically unsaturated monomer which contains an acrylate or methacrylate group as well as one or more oxyalkylene groups per molecule such as oxyethylene and/or oxypropylene groups. The oxyalkylene-containing (meth)acrylate may correspond to formula (I) or (II):

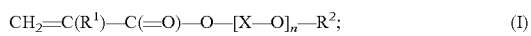

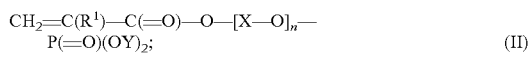

wherein $R^1$ is H or $CH_3$, $R^2$ is H or a $C_1$-$C_8$ alkyl group (e.g., methyl, ethyl, n-propyl, iso-propyl, n-butyl, sec-butyl, etc.), each X is independently —$(CH_2)_2$—, —$CH_2CH(CH_3)$— or —$CH(CH_3)CH_2$—, each Y is independently H, ammonium or an alkali metal atom (e.g., Na, K), and n is an integer of from 1 to 30 (or 2 to 25 or 3 to 20). Mixtures of different oxyalkylene-containing (meth)acrylates may be utilized.

The oxyalkylene-containing (meth)acrylate thus may be a polyethylene glycol mono(meth)acrylate and/or a phosphate ester of a polyethylene glycol mono(meth)acrylate. Such monomers are well known in the art and may be readily obtained from commercial sources. For example, the phosphate esters of polyethylene glycol mono(methacrylate) sold by Rhodia under the trade name Sipomer® PAM may be utilized. Monomers corresponding to Formula (I) may be prepared by reacting epoxides such as ethylene oxide and/or propylene oxide with (meth)acrylic acid and then optionally reacting the terminal hydroxyl group to form an alkyl ether group. It is understood that monomers prepared by such a method may be mixtures of compounds having different n values.

The amount of the oxyalkylene-containing (meth)acrylate in the copolymer of the hard polymer phase may be varied as needed to achieve the desired combination of properties in the final latex coating composition which is formulated using the multistage emulsion polymer. For example, an amount of oxyalkylene-containing (meth)acrylate may be incorporated which is effective to improve the freeze thaw stability of the latex coating composition as compared to a latex coating composition prepared using an analogous multistage emulsion polymer where the hard phase polymer does not contain any oxyalkylene-containing (meth)acrylate. At the same time, however, the use of excessive proportions of the oxyalkylene-containing (meth)acrylate should be avoided; for example, the desired Tg value for the hard polymer phase may be challenging to achieve if a relatively high amount of oxyalkylene-containing (meth)acrylate is present in the copolymer. Typically, suitable levels of oxyalkylene-containing (meth)acrylate in the hard phase copolymer will be from 0.5 to 10% by weight or from 1 to 8% by weight.

In one embodiment of the present invention, the copolymer present in the hard phase is a copolymer of one or more alkyl (meth)acrylates (e.g., a mixture of butyl acrylate and methyl methacrylate), methacrylic acid, a wet adhesion monomer such as hydroxyethyl ethylene urea methacrylate (HEEUMA), and an oxyalkylene-containing (meth)acrylate in accordance with Formula (I) or (II), with the relative proportions being selected so as to provide a Tg within the range of from 0° C. to 100° C. For example, the hard phase copolymer may be a copolymer of 35-45% by weight butyl acrylate, 45-55% by weight methyl methacrylate, 2-6% by weight methacrylic acid, 1-8% by weight wet adhesion monomer, and 1-8% by weight monomer of Formula (I) or Formula (II), the total equaling 100%.

In another embodiment, the polymer present in the soft phase is a copolymer of butyl acrylate and methyl methacrylate, with the relative proportions of these monomers being selected so as to provide a Tg of less than 0° C. which is at least 20° C. lower than the Tg of the copolymer present in the hard phase. For example, the soft phase copolymer may be a copolymer of 50-65% by weight butyl acrylate and 35-50% by weight methyl methacrylate, the total equaling 100%.

In a typical two stage process, the monomers for either the hard or soft polymer phase are emulsion polymerized to an average particle size of (for example) 25-150 nm, after which the monomer charge for the other polymer phase is introduced into the polymerization medium and polymerized in the presence of the first phase polymer particles to the desired average final particle size, e.g., less than 350 nm. As is well known in the art, control of latex particle size can be accomplished by a variety of techniques, any of which may be applied to the multi-stage polymerization.

The polymerization of the first polymer phase can be accomplished by known procedures for polymerization in aqueous emulsion. The monomer or comonomers to be employed in the preparation of the first domain polymer particles are dispersed into water with agitation sufficient to emulsify the mixture. The aqueous medium may also contain a free radical polymerization catalyst, an emulsifying agent (i.e., surfactant), or other ingredients that are known and conventionally employed in the art as emulsion polymerization aids.

Catalysts which may be used to cause free radical polymerization include thermal initiators as well as redox initiator systems composed of an oxidizing agent and a reducing agent. Suitable free radical polymerization catalysts are the catalysts known to promote emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and those catalysts that are activated in the water phase by a water-soluble reducing agent. Such catalysts are employed in a catalytic amount sufficient to cause polymerization. As a general rule, a catalytic amount ranges from about 0.01% to 5% by weight based upon the total monomers to be polymerized. As alternatives to heat or catalytic compounds to activate the polymerization, other free radical producing means, such as exposure to activating radiation, can be employed.

Suitable emulsifying agents include anionic, cationic, and nonionic emulsifiers customarily used in emulsion polymerization. Usually, at least one anionic emulsifier is utilized and one or more nonionic emulsifiers may also be utilized. Representative anionic emulsifiers are the alkyl aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. The emulsifying agents are employed in amounts to achieve adequate emulsification and to provide desired particle size and particle size distribution.

Other ingredients known in the art to be useful for various specific purposes in emulsion polymerization, such as bases, acids, salts, chain transfer agents, and chelating agents, can also be employed in the preparation of the polymer. In one embodiment of the invention, where the first stage forms the hard phase polymer and the second stage forms the soft phase polymer, the second stage polymerization is carried out following the neutralization of the first phase by a base such as sodium hydroxide, potassium hydroxide, ammonium hydroxide, sodium carbonate, sodium bicarbonate.

The monomers in each stage of the multi-stage polymerization may be added neat or as an emulsion in water. The manner of combining the polymerization ingredients can be by various known monomer feed methods, such as continuous monomer addition, incremental monomer addition, or addition in a single charge of the entire amount of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Polymerization to form the first polymer phase particles is generally initiated by heating the emulsified mixture with continued agitation to a temperature usually between 50 and 110° C., or between 60 and 100° C. Polymerization is continued by maintaining the emulsified mixture at the selected temperature until the desired degree of conversion of the monomer or monomers to polymer has been reached.

Following the polymerization to form the first domain polymer particles, the latex may be filtered to remove any precoagulum and then stabilized for storage (pending subsequent use as the dispersed first domain particles in the second stage polymerization) by the addition of a small amount of known stabilizer surfactant. In one embodiment, the filtering and intermediate stabilization steps for the first polymer latex are eliminated by proceeding directly to the polymerization of the monomers for the second polymer phase. The monomers for the second polymer phase are dispersed with agitation into the aqueous medium containing the first polymer phase particles and polymerized with continued agitation in generally the same manner and with the same optional polymerization aids as described for the preparation of the first polymer phase particles. The second polymer phase monomers may be pre-emulsified in water before being combined with the aqueous medium containing the first polymer phase particles. Additional quantities of one or more free radical polymerization catalysts may be added at the same time the monomers for the second polymer phase are introduced. Heating is carried out for a time effective to achieve the desired extent of monomer conversion of the second polymer phase.

Following polymerization, the solids content of the resulting aqueous heterogeneous polymer latex can be adjusted to the level desired by the addition of water or by the removal of water by distillation. Generally, the desired level of polymeric solids content is from about 20%-65% or from about 45%-60% by weight on a total weight basis.

Suitable particle sizes can generally be achieved directly from the polymerization. However, screening of the resulting latex to remove particles outside the desired size range and to thus narrow the particle size distribution may be employed. Other techniques such as high shear mixing, grinding, milling, homogenization and the like may also be employed to modify the particle size or particle size distribution, if so desired.

The polymer emulsion thereby obtained is useful as a binder component in formulating latex coating compositions such as paints and the like. Typically, the polymer emulsion is utilized in a latex coating composition in an amount of from 5 to 90% by weight. The content of multiphase emulsion polymer in a latex coating composition (calculated on a dry solids basis) typically is from 20 to 75% by weight.

For various applications, it is sometimes desirable to have small amounts of additives, such as surfactants, dispersants, thickeners, bactericides, pH modifiers, and antifoamers, incorporated in the latex coating composition. This may be done in a conventional manner and at any convenient point in the preparation of the latex coating compositions.

The latex coating compositions of the invention may include less than 2% by weight or less than 1.0% by weight of volatile anti-freeze agents based on the total weight of the aqueous coating composition. In another embodiment, the latex coating compositions are substantially free of volatile anti-freeze agents.

The latex coating composition may include at least one pigment. The term "pigment" as used herein includes non-film-forming solids such as pigments, extenders, and fillers. The at least one pigment may, for example, be selected from the group consisting of $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barytes (barium sulfate), zinc oxide, zinc sulfite, sodium oxide, potassium oxide and mixtures thereof. Typically, the at least one pigment includes at least one of $TiO_2$, $CaCO_3$ or clay. Generally, the mean particle sizes of the pigments may range from about 0.01 to about 50 microns. For example, $TiO_2$ particles used in the latex coating composition may have a mean particle size of from about 0.15 to about 0.40 microns. The pigment can be added to the latex coating composition as a powder or in slurry form. The pigment is typically present in the final formulated coating composition in an amount from about 5 to about 50 percent by weight, more typically from about 10 to about 40 percent by weight.

The coating composition can optionally contain additives such as one or more film-forming aids or coalescing agents. Suitable film-forming aids or coalescing agents include plasticizers and drying retarders such as high boiling point polar solvents. Other conventional coating additives such as, for example, dispersants, additional surfactants (i.e. wetting agents), rheology modifiers, defoamers, thickeners, biocides, mildewcides, colorants such as colored pigments and dyes, waxes, perfumes, co-solvents, pH adjustment agents (e.g., acids, bases) and the like, can also be used in accordance with the invention. These additives are typically present in the latex coating composition in an amount from 0 to about 15% by weight, more typically from about 1 to about 10% by weight, based on the total weight of the coating composition. In one embodiment of the invention, the latex coating composition contains little or no volatile coalescing agent or volatile film-forming agent (e.g., <0.5% by weight or <0.1% by weight).

As mentioned above, the latex coating composition in some embodiments can include less than 2.0% of anti-freeze agents based on the total weight of the aqueous coating composition. Exemplary anti-freeze agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More typically, the latex coating composition includes less than 1.0% or is substantially free (e.g., includes less than 0.1%) of anti-freeze agents. Accordingly, the aqueous coating composition of the invention typically has a VOC level of less than about 100 g/L and more typically less than or equal to about 50 g/L. Despite the fact that the latex coating compositions of the invention include little or no volatile anti-freeze agents, the compositions are capable of possessing freeze-thaw stabilities at levels desirable in the art.

The balance of the latex coating composition of the invention may be water. Although much of the water is present in the polymer latex binder and in other components of the aqueous coating composition, water is generally also added separately to the latex coating composition. Typically, the latex coating composition includes from about 10% to about 85% by weight and more typically from about 35% to about 80% by weight water. Stated differently, the total solids content of the latex coating composition is typically from about 15% to about 90% or from about 20% to about 65%.

The coating compositions are typically formulated such that the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, biocides, mildewcides, colorants, waxes, and the like, that do not evaporate upon drying of the coating composition.

The latex coating compositions of the present invention are typically in the form of stable fluids that can be applied to a wide variety of materials such as, for example, metal, wood, paper, cardboard, composites, plastics, concrete, glass, ceramics, plaster, dry wall, other coatings, cloth, foams, and the like. The substrate may have been previously painted, primed, undercoated, sanded, conversion coated, oxidized, chemically treated, etched, or the like. The coating composition may be applied to the material or substrate by any suitable method such as, for example, dipping, brushing, spraying, roller coating, knife coating, or the like. Typically, a thin uniform layer (film) of the coating composition is formed on the substrate surface and then dried to form a dry coating. Drying may be accelerated by heating, if so desired. Multiple dry coating layers may be formed by applying successive layers of the coating composition. The latex binders of the present invention are suitable for use in a wide range of both interior and exterior zero to low VOC paints from gloss to flat.

The coating compositions of the invention may also be readily adapted for use in pressure sensitive adhesives, caulks and sealants, in addition to paints.

EXAMPLES

Characterization Methods:

Freeze-thaw stability (modified ASTM D2243-82): 1) Fill half pint cans two-thirds full with paint; Measure and record initial KU viscosity; 2) Cans are placed in freezer at 0° F. for 16~18 hours and then thawed at room temperature for 24 hours; KU viscosity is measured if the paints appear to be fluid; 3) Step 2 and 3 are repeated 5 times or the paint is coagulated irreversibly.

Low temperature coalescence (LTC): The drawdown films were prepared on Leneta 1B Opacity Charts using 10-mil bird applicator for LTC. The paint films were placed in a 40° F. refrigerator immediately after the films were drawn down and allowed to dry for 24 hours. The dried films were examined for continuity. The degree of cracking on the sealed and unsealed portions was rated on a 1 to 5 scale as follows:

1=severe cracking
2=moderate cracking
3=some cracking
4=slight cracking
5=no cracking Block resistance: The test paints were prepared on Leneta 1B opacity charts using a 3-mil bird drawdown bar. The films for room temperature (RT) block were dried in a constant temperature and humidity environmental chamber for 1 day. Two square strips measuring 2.54 cm×2.54 cm were placed together with paint film against paint film under a 454-gram weight. After 24 hours, the strips were separated and evaluated according to ASTM D-4946 ratings. For the elevated temperature (ET) block test, the paint strips after 1-day drying at CT/CH were placed in a 120° F. oven for 30 minutes. The weight load of 1000 gram was transferred to the paint films via a 2.54 cm diameter rubber stopper. The films were allowed to cool for 30 minutes before the block ratings were given. Room and elevated temperature block were rated on the ASTM D-4946 scale from 0 (worst) to 10 (best). The test was run in triplicate and the average value was reported.

Polymer Latex Binders and Process

Comparative Example 1

450 parts of deionized water, 1.8 parts of sodium carbonate, and 39.4 parts of sodium lauryl sulfate (SLS, 30% in water) were charged into a reactor equipped with a paddle stirrer, reflux condensers, thermocouples, and stainless steel feed lines. When the reactor was heated to 85° C., 2.8 parts of sodium persulfate solution in 35.0 parts water was added thereto. The hard phase monomer mixture (calculated Tg ~20° C. using the Fox equation) consisting of 220 parts water, 7.9 parts SLS, 173.7 parts butyl acrylate (BA), 211.5 parts methyl methacrylate (MMA), 18.0 parts methacrylic acid (MAA), and 24.0 parts hydroxyethyl ethylene urea methacrylate (HEEUMA, 50% in water) was pre-emulsified by stirring in a separate container and then added continuously to the reactor for 1 hour. After 10 minutes of starting the hard phase monomer feed, the addition of a sodium carbonate (5.1 parts) solution was begun, 16.3% of which was fed over 50 minutes and the remainder added over 5 minutes. The first stage polymer reaction mixture was then held at 87° C. for 15 minutes. At the end of the hold, the pre-emulsified soft phase monomer mixture consisting of 123.0 parts water, 433.0 parts BA, 335.0 parts MMA, and 4.0 parts SLS was polymerized at 80° C. in the presence of the first stage composition. 2.8 parts of sodium persulfate solution were added simultaneously for 150 minutes. The reactor contents were then held at 80° C. for 30 minutes. To reduce the residual monomer concentrations, 0.9 parts of tertiary-butyl hydroperoxide (tBHP) and 1.4 parts of sodium metabisulfite (SMBS) were fed over 30 minutes at 80° C. The solids content of the resulting polymer latex binder was 50.8% and the average particle size was 72 nm.

Example 1

Example 1 (in accordance with the present invention) was prepared following the procedure described in Comparative Example 1 except that 12.0 parts of PEGMA 526 (polyethylene glycol methacrylate from Aldrich) was added to the hard phase monomer composition. The solids content of the polymer latex binder was 51.3% and the average particle size was 78 nm.

Example 2

Example 2 (in accordance with the present invention) was prepared following the procedure described in Comparative Example 1 except that 12.0 parts of Sipomer PAM200 (from Rhodia) was added to the hard phase monomer composition. The solids content of the polymer latex binder was 50.5% and the average particle size was 77 nm.

The polymer latex binder compositions of Comparative Example, Example 1 and Example 2 were formulated into low VOC latex coating compositions using the various additional components listed in Table 1. Table 2 shows the properties of the latex coating compositions.

TABLE 1

Low VOC Latex Coating Composition

|  | Density lbs/gallon | Mass (lbs) | Vol (Gallons) |
|---|---|---|---|
| Common Grind |  |  |  |
| Water | 8.33 | 32.0 | 3.8 |
| Proxel ® GXL preservative | 9.4129 | 1.5 | 0.2 |
| BYK ® 025 defoamer | 8.34 | 0.5 | 0.1 |
| Tamol ® 1124 dispersant | 9.9 | 20.0 | 2.0 |
| Ammonia (28%) | 7.7 | 4.0 | 0.5 |
| Ti-Pure ® R-706 TiO₂ | 33.3 | 210.0 | 6.3 |
| Water | 8.33 | 50.0 | 6.0 |
| Total Grind |  | 318.0 | 18.9 |
| Letdown |  |  |  |
| Polymer latex binder | 8.85 | 580.0 | 65.5 |
| BYK ® 025 defoamer | 8.34 | 2.0 | 0.2 |
| Rheolate ® 278 thickener | 8.58 | 4.5 | 0.5 |
| Water | 8.33 | 124.0 | 14.9 |
| Total Paint |  | 1028.5 | 100.1 |

TABLE 2

|  |  | CE1 | E1 | E2 |
|---|---|---|---|---|
|  | Equilibrated KU | 103 | 104 | 98 |
| Low Temperature Coalescence | sealed | 5 | 5 | 3 |
| scale 1-5, 5 = best | unsealed | 5 | 5 | 2 |
| Block Resistance | 1d-RT | 8 | 8 | 8 |
|  | 1d-ET | 5 | 5 | 3 |
| Freeze thaw | FT cycles | failed | 5 | 5 |
|  | KU change after 5 FT cycles | >40 | 9 | 8 |

What is claimed is:

1. A multiphase emulsion polymer for coating compositions, said multiphase emulsion polymer comprising at least one hard phase polymer having a glass transition temperature of from 0 to 100° C. and at least one soft phase polymer having a glass transition temperature at least 20° C. lower to no more than 100° C. lower than the glass transition temperature of the hard phase polymer using the Fox equation,
wherein the hard phase polymer is a copolymer of one or more ethylenically unsaturated monomer, and one or more oxyalkylene-containing (meth)acrylate corresponding to formula (I) or (II) or a mixture thereof:

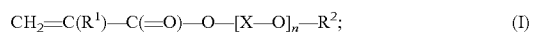

$$CH_2=C(R^1)-C(=O)-O-[X-O]_n-R^2; \quad (I)$$

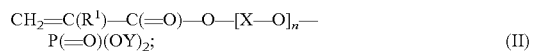

$$CH_2=C(R^1)-C(=O)-O-[X-O]_n-P(=O)(OY)_2; \quad (II)$$

wherein $R^1$ is H or $CH_3$, $R^2$ is H or a $C_1$-$C_8$ alkyl group, each X is independently $-(CH_2)_2-$, $-CH_2CH(CH_3)-$ or $-CH(CH_3)CH_2-$, each Y is independently H, ammonium or an alkali metal atom, and n is an integer of from 1 to 30,
wherein the soft phase polymer is a copolymer of monomers selected from the group consisting of C1-C18 alkyl(meth)acrylates, halo- and hydroxyl substituted alkyl esters of (meth)acrylic acid, vinyl esters of linear and branched carboxylic acids having 2 to 20 carbon atoms, unsaturated C3-C6 monocarboxylic acids, monoesters of unsaturated C4-C6 dicarboxylic acids, unsaturated C4-C6 dicarboxylic acids, (meth)acrylonitrile, cycloalkyl(meth)acrylates, aryl and alkaryl esters of (meth)acrylates, acetoacetate-containing acrylate monomers, olefins, and dienes,
wherein the at least one hard polymer phase is formed as a first stage polymer and the at least one soft polymer phase is subsequently polymerized in the presence of the first stage polymer,
wherein the multiphase emulsion polymer is in the form of latex particles and wherein the latex particles comprise an inner phase comprised of the soft phase polymer and an outer phase comprised of the hard phase polymer, and
wherein the multiphase emulsion polymer is in the form of latex particles having an average particle size of less than 200 nm.

2. The multiphase emulsion polymer of claim 1, wherein the at least one ethylenically unsaturated monomer is a mixture of at least one alkyl (meth)acrylate, methacrylic acid and at least one wet adhesion monomer.

3. The multiphase emulsion polymer of claim 1, wherein the at least one ethylenically unsaturated monomer is a mixture of butyl acrylate, methyl methacrylate, methacrylic acid and hydroxyethyl ethylene urea methacrylate.

4. The multiphase emulsion polymer of claim 1, wherein the hard phase polymer is a copolymer is comprised of 0.5 to 10% by weight of oxyalkylene-containing (meth)acrylate.

5. The multiphase emulsion polymer of claim 1, wherein the oxyalkylene-containing (meth)acrylate is a polyethylene glycol methacrylate.

6. The multiphase emulsion polymer of claim 1, wherein the oxyalkylene-containing (meth)acrylate is a phosphate ester of a polyethylene glycol methacrylate.

7. The multiphase emulsion polymer of claim 1, wherein the multiphase emulsion polymer is in the form of latex particles having an average particle size of less than 150 nm.

8. The multiphase emulsion polymer of claim 1, wherein the soft phase polymer is a copolymer of C1-C18 alkyl (meth)acrylates.

9. The multiphase emulsion polymer of claim 1, wherein the soft phase polymer is a copolymer of butyl acrylate and methyl methacrylate.

10. The multiphase emulsion polymer of claim 1, wherein the soft polymer phase represents from 90% to 40% by weight of the multiphase emulsion polymer and the hard polymer phase represents from 10% to 60% by weight of the multiphase emulsion polymer, the total weight amount of soft polymer phase and hard polymer phase equaling 100%.

11. A method of making a polymer latex binder for coating compositions, comprising:
(a) copolymerizing an aqueous multiphase emulsion of one or more ethylenically unsaturated monomer, and one or more oxyalkylene-containing (meth)acrylate corresponding to formula (I) or (II) or a mixture thereof:

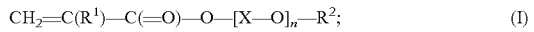

$$CH_2=C(R^1)-C(=O)-O-[X-O]_n-R^2; \quad (I)$$

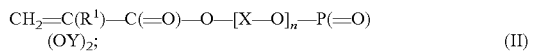

$$CH_2=C(R^1)-C(=O)-O-[X-O]_n-P(=O)(OY)_2; \quad (II)$$

wherein $R^1$ is H or $CH_3$, $R^2$ is H or a $C_1$-$C_8$ alkyl group, each X is independently $-(CH_2)_2-$, $-CH_2CH(CH_3)-$ or $-CH(CH_3)CH_2-$, each Y is independently H, ammonium or an alkali metal atom, and n is an integer of from 1 to 30, to form a hard phase polymer having a glass transition temperature of from 0 to 100° C.;
(b) polymerizing one or more additional monomers in the presence of the hard phase polymer to form a soft phase polymer;
wherein the soft phase polymer is a copolymer of monomers selected from the group consisting of C1-C18 alkyl(meth)acrylates, halo- and hydroxyl substituted alkyl esters of (meth)acrylic acid, vinyl esters of linear and branched carboxylic acids having 2 to 20 carbon atoms, unsaturated C3-C6 monocarboxylic acids, monoesters of unsaturated C4-C6 dicarboxylic acids, unsaturated C4-C6 dicarboxylic acids, (meth)acrylonitrile, cycloalkyl(meth)acrylates, aryl and alkaryl esters of (meth)acrylates, acetoacetate-containing acrylate monomers, olefins, and dienes,
wherein the hard phase polymer has a glass transition temperature of from 0 to 100° C. and the soft phase polymer has a glass transition temperature at least 20 to 100° C. lower than the glass transition temperature of the hard phase polymer;
wherein the emulsion polymer is in the form of latex particles having an average particle size of less than 200 nm, and wherein the latex particles comprise an outer phase comprised of the hard polymer phase and an inner phase comprised of the soft polymer phase.

12. The method of claim 11, wherein the at least one ethylenically unsaturated monomer is a mixture of at least one alkyl (meth)acrylate, methacrylic acid and at least one wet adhesion monomer.

13. The method of claim 11, wherein the at least one ethylenically unsaturated monomer is a mixture of butyl acrylate, methyl methacrylate, methacrylic acid and hydroxyethyl ethylene urea methacrylate.

14. The method of claim 11, wherein the hard phase is a copolymer comprised of 0.5 to 10% by weight of oxyalkylene-containing (meth)acrylate.

15. The method of claim 11, wherein the oxyalkylene-containing (meth)acrylate is a polyethylene glycol methacrylate.

16. The method of claim 11, wherein the oxyalkylene-containing (meth)acrylate is a phosphate ester of a polyethylene glycol methacrylate.

17. The method of claim 11, wherein the soft phase polymer is a copolymer of C1-C18 alkyl (meth)acrylates.

18. The method of claim 11, wherein the soft phase polymer is a copolymer of butyl acrylate and methyl methacrylate.

19. The method of claim 11, wherein the soft polymer phase represents from 90% to 40% by weight of the multiphase emulsion polymer and the hard polymer phase represents from 10% to 60% by weight of the multiphase emulsion polymer, the total weight amount of soft polymer phase and hard polymer phase equaling 100%.

* * * * *